(12) United States Patent
Agarwal

(10) Patent No.: US 12,507,958 B1
(45) Date of Patent: Dec. 30, 2025

(54) APPARATUS AND METHOD TO MITIGATE CARDIAC MOTION AND RESPIRATORY MOTION ON GEOMETRIC MEASUREMENTS OF CARDIAC ELECTRODES

(71) Applicant: Anumana, Inc., Cambridge, MA (US)

(72) Inventor: Animesh Agarwal, San Mateo, CA (US)

(73) Assignee: Anumana, Inc., Cambridge, MA (US)

( * ) Notice: Subject to any disclaimer, the term of this patent is extended or adjusted under 35 U.S.C. 154(b) by 0 days.

(21) Appl. No.: 19/085,702

(22) Filed: Mar. 20, 2025

(51) Int. Cl.
*A61B 5/00* (2006.01)
*A61B 5/06* (2006.01)
*A61B 5/283* (2021.01)

(52) U.S. Cl.
CPC .............. *A61B 5/721* (2013.01); *A61B 5/062* (2013.01); *A61B 5/283* (2021.01)

(58) Field of Classification Search
CPC ....... A61B 5/7207; A61B 5/721; A61B 5/062; A61B 5/283
See application file for complete search history.

(56) References Cited

U.S. PATENT DOCUMENTS

| | | | |
|---|---|---|---|
| 8,170,312 B2 | 5/2012 | Chen et al. | |
| 8,233,688 B2 | 7/2012 | Soubelet et al. | |
| 9,189,851 B2 | 11/2015 | Liao et al. | |
| 9,808,171 B2 | 11/2017 | Balachandran et al. | |
| 10,390,754 B2 | 8/2019 | Brost et al. | |
| 11,213,235 B2 | 1/2022 | Osadchy et al. | |
| 2012/0172867 A1* | 7/2012 | Ryu | A61B 34/20 606/41 |
| 2020/0138334 A1* | 5/2020 | Hill | A61B 5/6852 |

OTHER PUBLICATIONS

A. BROSt et al "Combined Cardiac and Respiratory MotionCompensation for Atrial Fibrillation AblationProcedures" "Med Image Comput Comput Assist Interv. 2011; 14(Pt 1):540-7.".
S. Kaeppler et al "Motion Estimation Model for Cardiacand Respiratory Motion Compensation" "Information Processing in Computer-Assisted Interventions 2012 DOI: 10.1007/978-3-642-30618-1_10".
A. Petzl et al "Patient-specific quantification of cardiorespiratorymotion for cardiac stereotactic radioablationtreatment planning" Clinical | Ventricular Tachycardiavol. 5, Issue 4p234-242Apr. 2024.

* cited by examiner

*Primary Examiner* — Manuel L Barbee
(74) *Attorney, Agent, or Firm* — Caldwell Intellectual Property Law

(57) ABSTRACT

An apparatus and method to mitigate cardiac motion and respiratory motion on geometric measurements of cardiac electrodes. The apparatus includes at least a processor and a memory communicatively connected to the at least a processor configured to receive the at least a position signal comprising a first, second, and third spatial coordinate, and compensate, using a cardiac compensator and respiratory compensator, for respiratory motion, wherein compensating for the respiratory motion comprises calculating at least a velocity signal, using the at least a position signal, extracting, using the cardiac compensator, cardiac motion from the at least a position signal as a function of the at least a position signal and the at least a velocity signal, determining, using the respiratory compensator, a respiratory phase, and extracting the respiratory motion as a function of the respiratory phase.

28 Claims, 10 Drawing Sheets

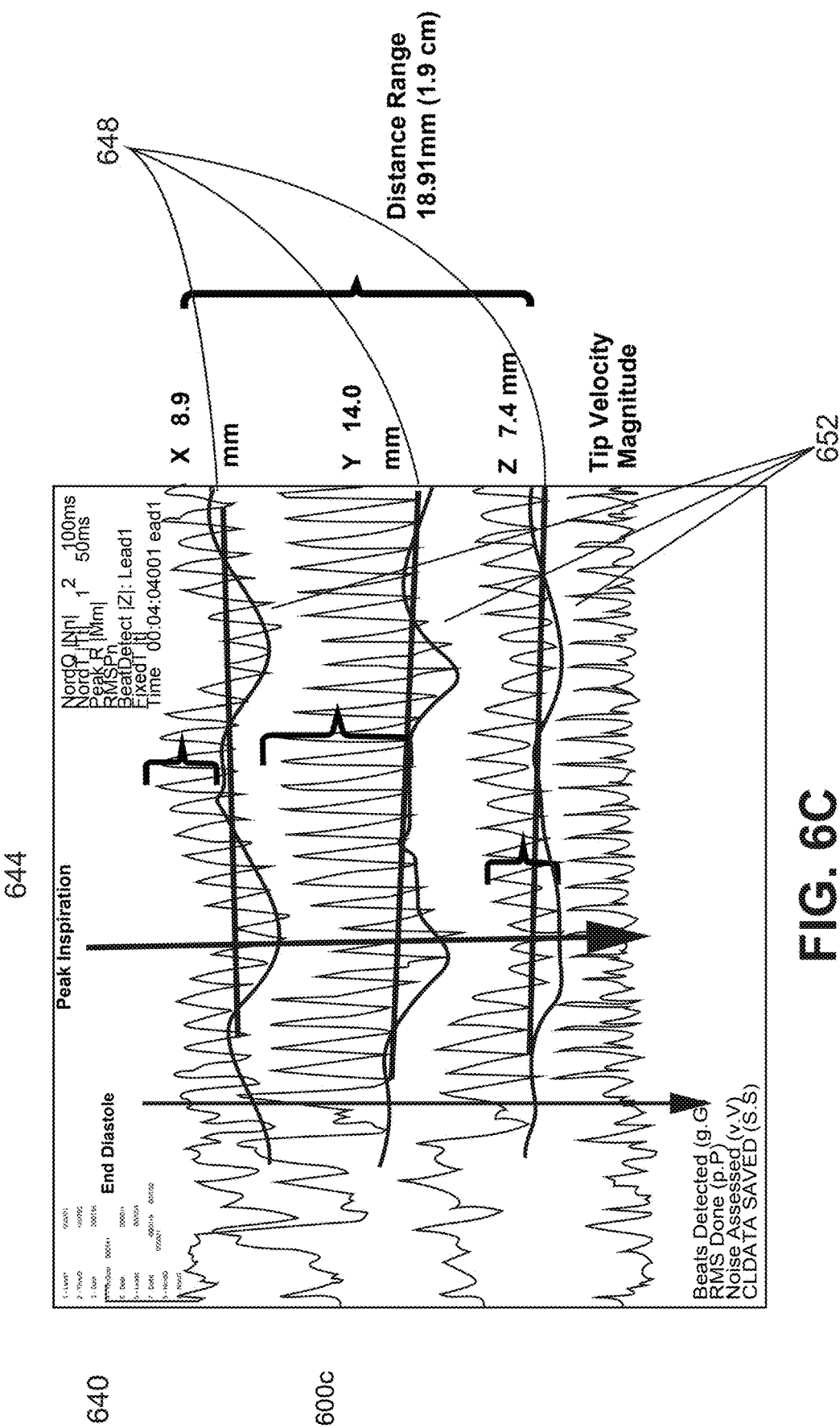

APPARATUS AND METHOD TO MITIGATE CARDIAC MOTION AND RESPIRATORY MOTION ON GEOMETRIC MEASUREMENTS OF CARDIAC ELECTRODES

FIELD OF THE INVENTION

The present invention generally relates to the field of clinical cardiac electrophysiology. In particular, the present invention is directed to an apparatus and a method to mitigate cardiac motion and respiratory motion on geometric measurements of cardiac electrodes.

BACKGROUND

In clinical electrophysiologic (EP) procedures on patients with cardiac arrhythmias catheters with multiple electrodes are inserted, via veins or arteries, into cardiac chambers or tissues to record electrical signals (electrograms) that help the physicians diagnose and treat the patients. EP systems are used to record these signals, analyze them to make measurements (metrics) used to characterize the arrhythmias, assess the normality or abnormality of the heart tissue, and to plan a treatment strategy for the patient. Additionally, EP systems record the geometric locations of one or more of the catheter electrodes. These points in 3-D space allow the estimation of the cardiac surface that can be used to display information about the heart. Additionally, the heart and catheter electrodes move with each inspiration and expiration with each breath of the patient. This interference distorts the recorded surface and results in a very bumpy and spikey surface, including, as a non-limiting example, errors of +1.5 cm or more. The current approach of utilizing minimum electrode velocity does not account for the need to address both cardiac and respiratory motion. Importantly, this technology must be applied to impedance-based localization for all EP electrodes.

SUMMARY OF THE DISCLOSURE

This application describes a method to characterize and track both types of motion, for each electrode in the study for every heartbeat. Furthermore, the method describes a way to mitigate and remove these interfering motions that will improve the ability of a reliable surface to be generated to display the EP data.

Described is a method to mitigate the significant interference of cardiac and respiratory motion on the acquisition of the 3-D geometric measurements of cardiac electrodes used to acquire signals used in electrophysiologic studies. The positions are used to compute a 3-D surface used to display cardiac data recorded at all the locations on that surface. The motion of the heart during its compression and relaxation for each heartbeat, coupled with the motion of the lungs during inspiration and expiration of each breath distort the measurement of the surface locations by up to +1.5 cm at each site. This results in a very bumpy, jagged surface. The method describes a means to track and characterize these motions and a means to remove them that results in a smooth surface that approximates what is seen in advanced radiological imaging, e.g. 3D surfaces generated from computed tomography (CT) or magnetic resonance imaging (MRI) images.

In an aspect, an apparatus to mitigate cardiac motion and respiratory motion on geometric measurements of cardiac electrodes includes at least a processor and a memory communicatively connected to the at least a processor. The memory contains instructions configuring the processor to receive, using the at least a processor, the at least a position signal comprising a first spatial coordinate, a second spatial coordinate, and a third spatial coordinate, compensate, using a cardiac compensator, cardiac motion, wherein compensating the cardiac motion comprises calculating, using the cardiac compensator, a velocity for each spatial coordinate of the at least a position signal of the optimal lead, computing, using the cardiac compensator, a velocity magnitude as a function of the velocity for all spatial coordinates, determining, using the cardiac compensator, a first temporal datum corresponding to a first minimum velocity and a second temporal datum corresponding to a second minimum velocity as a function of the at least a potential signal associated with the least a position signal of the optimal lead, and plotting, using the at least a potential signal from the at least an electrode of the optimal lead, a distribution as a function of the at least a position signal and the second temporal datum of the second minimum velocity, and compensate, using a respiratory compensator, respiratory motion by interpolating, using the respiratory compensator, the distribution, determining, using the respiratory compensator, a respiratory phase by analyzing a rate of change of the distribution, and extracting the respiratory motion during an expiration phase of the respiratory phase.

In another aspect, a method to mitigate cardiac motion and respiratory motion on geometric measurements of cardiac electrodes includes receiving, using at least a processor, at least a position signal comprising a first spatial coordinate, a second spatial coordinate, and a third spatial coordinate, compensating, using a cardiac compensator, cardiac motion, wherein compensating the cardiac motion comprises calculating, using the cardiac compensator, a velocity for each spatial coordinate of the at least a position signal of the optimal lead, computing, using the cardiac compensator, a velocity magnitude as a function of the velocity for all spatial coordinates, determining, using the cardiac compensator, a first temporal datum corresponding to a first minimum velocity and a second temporal datum corresponding to a second minimum velocity as a function of the at least a potential signal associated with the least a position signal of the optimal lead, and plotting, using the at least a potential signal from the at least an electrode of the optimal lead, a distribution as a function of the at least a position signal and the second temporal datum of the second minimum velocity, and compensating, using a respiratory compensator, respiratory motion by interpolating, using the respiratory compensator, the distribution, determining, using the respiratory compensator, a respiratory phase by analyzing a rate of change of the distribution, and extracting the respiratory motion during an expiration phase of the respiratory phase.

In another aspect an apparatus to mitigate cardiac motion and respiratory motion on geometric measurements of cardiac electrodes may include at least a catheter configured for intracardiac use, the at least a catheter including at least an electrode configured to detect a cardiac phenomenon and output at least a potential signal, as a function of the cardiac phenomenon, at least a localization system configured to detect at least a position signal as a function of a location of the at least a catheter and at least a computing device, wherein the computing device includes a memory and at least a processor communicatively connected to the memory, wherein the memory contains instructions configuring the at least a processor to: receive, using the at least a processor, the at least a position signal comprising a first spatial coordinate, a second spatial coordinate, and a third spatial coordinate, compensate, using a cardiac compensator and respiratory compensator, for respiratory motion, wherein compensating for the respiratory motion comprises calculating at least a velocity signal, using the at least a position signal, extracting, using the cardiac compensator, cardiac motion from the at least a position signal as a function of the at least a position signal and the at least a velocity signal, determining, using the respiratory compensator, a respiratory phase by analyzing a rate of change of position values as a function of the position signal, and extracting the respiratory motion as a function of the respiratory phase.

In another aspect, a method to mitigate cardiac motion and respiratory motion on geometric measurements of cardiac electrodes may include receiving, using the at least a processor, the at least a position signal comprising a first spatial coordinate, a second spatial coordinate, and a third spatial coordinate, compensating, using a cardiac compensator and respiratory compensator, for respiratory motion, wherein compensating for the respiratory motion comprises calculating at least a velocity signal, using the at least a position signal, extracting, using the cardiac compensator, cardiac motion from the at least a position signal as a function of the at least a position signal and the at least a velocity signal, determining, using the respiratory compensator, a respiratory phase by analyzing a rate of change of position values as a function of the position signal, and extracting the respiratory motion as a function of the respiratory phase.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 6C is a graph showing heart motion over the second time with additional annotations;

Figure 1:
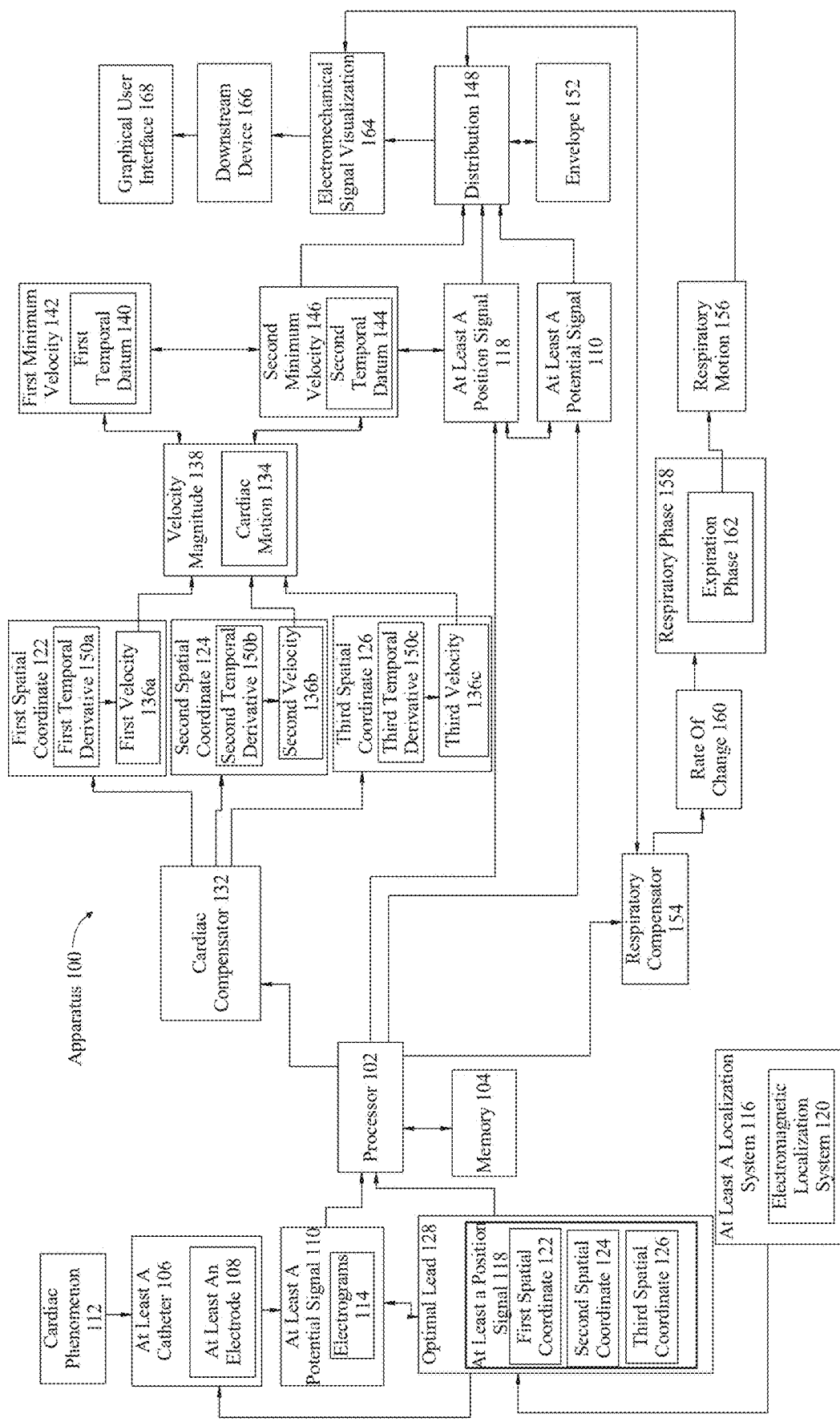
FIG. 1 is a block diagram of an apparatus to mitigate cardiac motion and respiratory motion on geometric measurements of cardiac electrodes.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

During EP procedures to assess and treat patients with cardiac arrhythmias, catheters with one or more electrodes may be inserted into arteries and veins in the body and heart as well as the surfaces of the heart and its cavities. In addition to the measuring the cardiac generated signals from these electrodes, the 3-dimensional (3D) locations of the electrodes may be measured. These are used to create 3D surfaces of the heart and its cavities that allow visualization of features of the electrical measurements to be plotted. Continuing, these may be crucial for understanding the characteristics of a patient's arrhythmia and for developing a treatment strategy. Without limitation, the motions of the electrodes are confounded by every heart beat during compression and relaxation of the heart as well as during every breath, inspiration and expiration. Continuing, these confounding motions distort the geometric images by as much a 1.5 cm and are unique for each electrode as well as the location of the electrode.

In a non-limiting example, the following steps may be used to measure, characterize, and mitigate the interfering cardiac motion from the X, Y, and Z measurements. First, 3D coordinates can be established using conventional impedance-based or magnetic-based geometry recording systems. These systems may generate three calibrated electric signals to provide distance in X, Y, and Z coordinates in 3D space at a rate of approximately 40 samples per second. Continuing, the velocity of the signals in X, Y, and Z may be calculated by determining the temporal derivative. Continuing, the velocity magnitude may then be calculated as the square root of the sum of the squares of the X, Y, and Z velocities. Without limitation, for each heartbeat, there may be two instances of maximum velocity: one occurring during maximum compression when the ventricles contract, and another during maximum relaxation as the aortic valve opens, forcing blood from the ventricles. Correspondingly, two minimum velocity magnitudes often occur within each heartbeat cycle: one between the two maximum velocity peaks, and another just prior to the first peak. Continuing, this method may detect the time of the second minimum velocity for each beat, specifically the minimum velocity just before the onset of the next beat. At this point, the X, Y, and Z measurements are recorded. The saved points of minimum velocity may be connected by lines to form an envelope, defining stable positions for each electrode. This envelope may provide a smooth surface unaffected by cardiac motion. Electrical metric measurements from the electrodes may be utilized to plot their distributions for a specific beat, using the X, Y, and Z measurements from the minimum velocity envelope at the time of that beat.

At a high level, aspects of the present disclosure are directed to apparatus and methods to mitigate cardiac motion and respiratory motion on geometric measurements of cardiac electrodes. The apparatus includes at least a computing device comprised of a processor and a memory communicatively connected to the processor. The memory instructs the processor to receive the at least a position signal comprising a first spatial coordinate, a second spatial coordinate, and a third spatial coordinate. The processor compensates, using a cardiac compensator and respiratory compensator, for respiratory motion, wherein compensating for the respiratory motion comprises calculating at least a velocity signal, using the at least a position signal, extracting, using a cardiac compensator, cardiac motion from the at least a position signal as a function of the at least a position signal and the at least a velocity signal, determining, using the respiratory compensator, a respiratory phase by analyzing a rate of change of position values as a function of the position signal, and extracting the respiratory motion as a function of the respiratory phase.

Referring now to FIG. 1, an exemplary embodiment of apparatus 100 to mitigate cardiac motion and respiratory motion on geometric measurements of cardiac electrodes is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communication connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, the apparatus comprises at least a catheter 106 configured for intracardiac use, the at least a catheter 106 comprising at least an electrode 108 configured to detect a cardiac phenomenon 112 and output at least a potential signal 110, as a function of the cardiac phenomenon 112. As used in this disclosure, an "electrode" is a conductor through which electrical signals enter or exit a medium. Without limitation, the electrode 108 may detect, measure, or transmit electrical activity from the body, such as the heart or brain. Electrodes and transducers may be used together in medical devices where the electrodes detect and record electrical signals from the body (e.g., heart activity), while transducers convert other forms of energy (e.g., ultrasound or pressure) into electrical signals for imaging or measuring physical parameters, enabling simultaneous monitoring of electrical and mechanical functions. As used in this disclosure, a "transducer" is a device designed to convert one form of energy into another. In a non-limiting example, transducer may facilitate the measurement, monitoring, and control of various physical quantities. Without limitation, this energy conversion capability may enable transducers to be used for various applications. In a non-limiting embodiment, a transducer may detect at least a cardiac phenomenon 112 and output potential signal 110. As used in this disclosure, a "cardiac phenomenon" is any physiological or pathological event, activity, or condition related to the function or behavior of the heart that can be detected or measured. The cardiac phenomenon 112 includes but is not limited to electrical signals, mechanical movements, pressure changes, and/or biochemical processes occurring within the heart or its surrounding tissues. The cardiac phenomenon 112 may be crucial indicators of heart health and function and may provide valuable data for diagnosing, monitoring, and treating various cardiac conditions. In a non-limiting example, a cardiac phenomenon 112 may refer to the electrical activity associated with the heart's rhythm, such as the depolarization and repolarization of cardiac cells that create the P wave, QRS complex, and T wave observed in an electrocardiogram. In another non-limiting example, the transducer may include a plurality of clinical transducers.

With continued reference to FIG. 1, as used in this disclosure, "potential signal" is electrical signals generated and output by a transducer in response to detecting cardiac phenomenon 112. Without limitation, the potential signal 110 may be indicative of the heart's electrical activity. Without limitation, the potential signal 110 may represent variations in electrical potential that occur as the heart undergoes its rhythmic contractions and relaxations, providing valuable data on the cardiac cycle and function.

With continued reference to FIG. 1, the apparatus 100 may include different hardware for specific measurements. In some embodiments, hardware may be transducers, sensors, and actuators. For the purposes of this disclosure, a "sensor" is a device used to transform one kind of energy into another. When a transducer converts a quantity of energy to an electrical voltage or an electrical current it is called a sensor. A measurable quantity of energy may include sound pressure, optical intensity, magnetic field intensity, thermal pressure, etc. When a transducer converts an electrical signal into another form of energy such as sound, light, mechanical movement, it is called an actuator. It should be noted that sound is incidentally a pressure field. Actuators allow the use of feedback at the source of the measurements.

With continued reference to FIG. 1, a sensor may be considered as a component or with a collection of electronics such as amplifiers, decoders, filters, computer devices and the apparatus 100. For the purposes of this disclosure an "instrument" is a sensor bundled with its associated electronics. However, in some embodiments, sensors may be further integrated with the apparatus 100.

With continued reference to FIG. 1, a sensor integrated with the apparatus 100 may be linear so that response y to a stimulus x is in the form: $y(x)=Ax$, $0 \leq x \leq x_{max}$, $A>0$. It should be noted, there is a presumption that the stimulus to be positive. A is the sensitivity of the transducer gain, or the gain of the sensor. The gain is presumed to be positive for which the linear model satisfies the definition of linearity: $y(x+z)=A(x+z)=y(x)+y(z)$. It should be noted that this example is an idealized form of a sensor and may extend beyond the linearity constraints which may include time dependency, memory, and its output keeping track of input. A more generalized sensor may include the steady state transfer function of the sensor. For this case, the sensitivity can be defined as the derivative of the output with respect to the input: $S=\partial y/\partial x$. In this example, the sensor exhibits sensitivities to other operating parameters (i.e. supply voltage) or temperature. For the purposes of this disclosure, "sensitivity" is the ratio of output to input. This can include electrical output and signal input or an input transducer. It can also include physical output to an electrical input, or an output transducer. Sensitivity can also be used in its usual electrical meaning. In this it would refer to a percent change of a property of a device because of a percent change in a parameter. In some embodiments this would be a percent change in gain as a result of percent change in ambient temperature. This type of sensitivity may be referred to as the Gain of a sensor.

Still referring to FIG. 1, the apparatus 100 with integrated sensors may not respond to arbitrarily small signals. The apparatus 100 may respond to signals within a specified range from zero to a sensor threshold which does not cause the output of the sensor to change. The existence of a threshold relates to the nonlinear behavior of the device and the noise. The apparatus 100 with an integrated sensor may fail to respond to stimuli which are arbitrarily large as well. In this case, the apparatus 100 integrated with a sensor may have a max range. The full range of the apparatus 100 integrated with a sensor may be limited by compression or clipping. Compression and clipping are results of nonlinearity and thus may include the apparatus 100 as a nonlinearity device.

Still referring to FIG. 1, referring to the linear equation above assuming a linear sensor is improved with the addition of a constant: $y(x)=b_0+Ax$. It should be noted that the equation is not linear even though it is described as a first order polynomial. The constant is called a zero offset and can be defined in two ways: a sensor reading when the input is zero, or the value of the stimulus required to make the output zero. The zero offset is corrected by subtracting $b_0$ from y and recovering the linear description of a sensor: $y'(x)=y(x)-b_0=Ax$.

With continued reference to FIG. 1, the apparatus 100 may include very fast measurements where it can internally store energy. The apparatus 100 output may depend on previous measurements the integrated sensors make. It should be noted that the sensor may exhibit memory. The time dependence of a sensor can be linear if the response is described by a linear differential equation:

$$\sum_{n=0}^{N} A_n \frac{\partial^n y}{\partial t^n} = \sum_{k=0}^{k} B_k \frac{\partial^k x}{\partial t^k}.$$

Taking the Laplace transform of this equation:

$$y(s, X) = \left( \frac{\sum_{k=0}^{K} B_k S^k}{\sum_{n=0}^{N} A_n S^n} \right) x = H(s)X(s),$$

which is in Laplace transform space and the sensor response is still linear in stimulus x. The response of a sensor with a transfer function H(s) at time t is the convolution integral between the history of the stimulus x and the inverse Laplace transform h(t) of $H(s): y(t)=\int_0^\infty h(\tau)\times(t-\tau)d\tau$. The apparatus 100 may behave like a low pass filter, wherein there is a delayed response to their input. There is a limit to the maximum stimulus frequency that can be detected. The maximum frequency a sensor can interpret is approximately the inverse of its response time.

With continued reference to FIG. 1, as used in this disclosure, a "catheter" is a tube inserted into the body to perform various medical procedures. In a non-limiting example, at least a catheter 106 may record and map at least a beat of a cardiac phenomenon 112 and output at least a visual element. In a non-limiting example, at least a catheter 106 may be used to facilitate the detection and mapping of cardiac activity. In a non-limiting example, at least a catheter 106 may be used in procedures such as cardiac ablation or electrophysiological studies to gather detailed information about heart rhythms. Without limitation, the catheter 106 may include one or more electrodes.

With continued reference to FIG. 1, the catheter 106 may include a high-density electrode mapping catheter. As used in this disclosure, a "high-density electrode mapping catheter" is a medical device designed to include a number of closely spaced electrodes along its surface. In a non-limiting example, the high-density electrode mapping catheter may be used for creating detailed electrical maps of cardiac tissue. Continuing, the high-density electrode mapping catheter may be inserted into the heart during an electrophysiological procedure to collect high-resolution data about the electrical activity of the heart's chambers. Continuing, the dense arrangement of electrodes on the high-density electrode mapping catheter may allow for more precise and detailed recordings.

With continued reference to FIG. 1, the high-density electrode mapping catheter may include a basket catheter, a grid catheter, a linear catheter, a loop catheter and the like. Continuing, the high-density electrode mapping catheters may be designed for specific purposes in cardiac electrophysiology to enhance the precision of mapping and treatment of arrhythmias. These catheters vary in design, flexibility, electrode count, and configuration to suit different parts of the heart and various medical needs. As used in this disclosure, a "basket catheter" is a high-density electrode mapping catheter with a flexible, basket-like structure composed of multiple splines (arms). In a non-limiting example, the splines of the basket catheter may expand when inserted into a heart chamber. Continuing, the basket catheter may include electrodes that are distributed along the splines to capture electrical signals from a wide area of the chamber. Continuing, the structure of the basket catheter may permit the catheter to conform to the shape of the chamber, providing detailed three-dimensional mapping of electrical activity across large regions of the heart. As used in this disclosure, a "grid catheter" is a catheter featuring a flat or grid-like arrangement of electrodes. Continuing, the grid catheter may include electrodes that are closely spaced, providing high spatial resolution for capturing detailed electrical data. Continuing, the structure of the grid catheter may provide particularly useful in detecting conduction abnormalities, such as areas of scar tissue or regions of abnormal electrical activity. As used in this disclosure, a "linear catheter" is a type of mapping catheter with electrodes arranged in a straight line along the catheter's shaft. In a non-limiting example, the linear catheter may be designed for mapping specific, narrow regions of the heart, such as along the septum or the pathways near veins and arteries. Continuing, the design of the linear catheter may allow for detailed analysis of conduction paths in confined areas. As used in this disclosure, a "loop catheter" is a catheter that forms a loop with multiple rings or arcs of electrodes around its structure. Without limitation, the loop catheter may expand once positioned in the heart, allowing for circumferential contact with the chamber walls, thus providing extensive coverage of the electrical signals within the chamber.

With continued reference to FIG. 1, the potential signal 110 may include an electrogram 114 (EGM) signal. As used in this disclosure, "electrograms" are the electrical recordings of cardiac activity captured from electrodes. In a non-limiting example, the electrodes used to capture the electrograms 114 may be placed either on the surface of the heart, within the heart, or in proximity to the heart. Continuing, the electrograms 114 may represent the electrical signals generated by the depolarization and repolarization of heart muscle cells during each heartbeat. In a non-limiting example, electrograms 114 may be used to analyze heart rhythms, diagnose arrhythmias, and guide procedures such as catheter ablation, electrophysiological studies, and the like. Without limitation, the electrograms 114 may be collected using the catheter 106.

Still referring to FIG. 1, the apparatus includes at least a localization system 116 configured to detect at least a position signal 118 as a function of a location of the at least a catheter 106. As used in this disclosure, a "localization system" is an apparatus designed to detect and determine the position of a catheter 106 within a body or environment by utilizing position signals 118. Continuing, these signals may be a function of at least a catheter 106 location, enabling precise tracking and navigation during medical procedures. In a non-limiting example, the purpose of at least a localization system 116 is to enhance the safety and efficacy of catheter-based interventions by providing critical spatial information. As used in this disclosure, a "position signal" is a signal generated by localization system 116 to determine the location of a catheter 106 within the body. With continued reference to FIG. 1, in a non-limiting example, localization system 116 may be consistent with one or more aspects of the localization system described in U.S. patent application Ser. No. 18/764,853, filed on Jul. 5, 2024, titled "SYSTEM AND METHOD FOR LOCATING A MEDICAL DEVICE USING AN ELECTRICAL FIELD CREATION," which is incorporated by reference herein in its entirety.

With continued reference to FIG. 1, at least a localization system 116 may include one or more of an electromagnetic localization system 120, an ultrasound-based localization system, an optical localization system, and an impedance-based localization system. As used in this disclosure, an "electromagnetic localization system" is a type of localization technology that uses electromagnetic fields to determine the precise position and orientation of objects within a given space. This system typically involves generating a low-frequency electromagnetic field in the area of interest, and then tracking the position of sensors or coils that respond to this field. The sensors may be integrated into catheters or other medical instruments, allowing for accurate real-time tracking of their location and movement within the body. In the context of electroanatomic mapping, the electromagnetic localization system 120 enables the precise localization of at least a catheter tip within the heart. This is achieved by placing electromagnetic field generators around the patient and using sensors on at least a catheter 106 to detect the field. The system calculates the exact position and orientation of at least a catheter 106 by measuring the electromagnetic field's strength and direction at the sensor's location. This information is then transmitted to the processor, which uses it to construct a detailed, three-dimensional map of the heart's anatomy. This technology is essential for guiding medical procedures such as catheter ablation, where precise navigation within the heart is critical. By providing accurate and real-time positional data, the electromagnetic localization system 120 ensures that at least a catheter 106 can be maneuvered safely and effectively to target areas of abnormal electrical activity, thereby improving the outcomes of the procedure.

With continued reference to FIG. 1, as used in this disclosure, an "ultrasound-based localization system" is a method used to determine the position and movement of objects within the body by employing high-frequency sound waves. The ultrasound-based localization system may involve the use of an ultrasound transducer that emits sound waves, which then reflect off internal structures and are captured by transducer or other sensors. Continuing, the reflected sound waves are processed to create real-time images or data points that represent the location and motion of the tracked object, such as a catheter 106 or other medical instruments. The ultrasound-based localization system may be particularly useful in medical procedures because it provides real-time, non-invasive visualization of internal body structures. The ultrasound-based localization system may allow clinicians to guide instruments accurately within the body, enhancing the precision and safety of procedures like catheter ablation, biopsies, or other interventions. This technology is often integrated with other systems to provide comprehensive spatial and functional mapping of the area being treated. For example, at least a localization system 116 may utilize ultrasound technology, where an array of ultrasound transducers is positioned around the patient. At least a catheter 106, may be fitted with miniature ultrasound receivers, detects the emitted ultrasound waves. At least a localization system 116 may calculate at least a catheter 106 position based on the time it takes for the ultrasound waves to reach the receivers, allowing for precise localization of at least a catheter tip during a procedure.

With continued reference to FIG. 1, as used in this disclosure, "optical localization system" is a method of determining the position and movement of objects using light, typically through the use of cameras and other optical sensors. Optical localization system technology may capture visual data from the tracked object and processes this information to calculate its precise location and trajectory in real-time. In an optical localization system, reflective markers or LED lights may be attached to the object being tracked, such as a catheter tip. Cameras positioned around the area capture the light reflected or emitted by these markers, and software algorithms analyze the captured images to triangulate the exact position of the markers. This data is then transmitted to the processor, which integrates it with other signals to create a comprehensive map of the object's movement within the heart. This method is highly accurate and provides detailed spatial information, making it particularly useful in medical applications where precise positioning is crucial. Optical localization system can be used in conjunction with other localization methods to enhance the overall accuracy and reliability of the electroanatomic mapping system.

With continued reference to FIG. 1, as used in this disclosure, "impedance-based localization system" is a technique used to determine the position of a catheter 106 or other medical device within the body by measuring the electrical impedance between the device and electrodes placed on the patient's body. This method involves passing a small, alternating current through the body and measuring the resulting voltage at different points, allowing the system to calculate the impedance. At least a localization system 116 can then use these impedance measurements to triangulate the exact position of at least a catheter tip within the heart or other body cavities. Impedance varies with the distance and the type of tissue between at least a catheter 106 and the electrodes, enabling precise tracking of the device's location. This technique is particularly useful in electroanatomic mapping and other procedures requiring accurate real-time positioning of medical instruments within the body. In a non-limiting example, position signal 118 may be generated using electromagnetic fields, ultrasound, or other tracking technologies to provide real-time spatial information about at least a at least a catheter 106 position. In a non-limiting example, apparatus 100 may employ other tracking technologies, such as optical localization system or impedance-based localization, to generate position signal 118. Optical localization system uses cameras and reflective markers on at least a catheter 106 to capture its movement and position, while impedance-based localization measures electrical impedance differences between at least a catheter 106 and the body tissues. These methods provide accurate real-time spatial information that processor 102 uses alongside the potential signal 110.

Still referring to FIG. 1, processor 102 is configured to receive, using the at least a processor, the at least a position signal 118 comprising a first spatial coordinate 122, a second spatial coordinate 124, and a third spatial coordinate 126. As used in this disclosure, a "spatial coordinate" is a numerical value or set of values that defines the specific location of a point in space relative to a reference system. In a non-limiting example, the spatial coordinates may represent the position of the catheter 106 in a three-dimensional space. Without limitation, the First spatial coordinate 122 may correspond to the catheter 106 position along the X-axis. Without limitation, the second spatial coordinate 124 may correspond to the catheter 106 position along the Y-axis. Without limitation, the third spatial coordinate 126 may correspond to the catheter 106 position along the Z-axis. Without limitation, the spatial coordinates may allow the apparatus to track the precise three-dimensional location of the catheter 106. In a non-limiting example, the spatial coordinates may provide critical real-time feedback to medical professionals and ensuring the accuracy of the catheter 106 placement during procedures.

Still referring to FIG. 1, processor 102 is configured to compensate, using a cardiac compensator 132 and respiratory compensator 154, for respiratory motion 156, wherein compensating for the respiratory motion 156 includes calculating at least a velocity signal, using the at least a position signal 118, extracting, using the cardiac compensator 132, cardiac motion 134 from the at least a position signal 118 as a function of the at least a position signal 118 and the at least a velocity signal, determining, using the respiratory compensator 154, a respiratory phase 158 by analyzing a rate of change 160 of position values as a function of the at least a position signal 118, and extracting the respiratory motion 156 as a function of the respiratory phase 158.

With continued reference to FIG. 1, the at least a processor 102 may be further configured to determine, as a function of a velocity magnitude 138 of the at least a velocity signal, a plurality of velocity minima, representing local minimum velocity values, and a corresponding plurality of temporal data, representing times of the local minimum velocity values, the at least a processor 102 is further configured to plot, using the at least a position signal 118, a distribution 148, representing position values corresponding to the plurality of temporal data, and determining the respiratory phase 158 comprises determining the respiratory phase 158 by analyzing a rate of change 160 of position values of the distribution 148. In some embodiments, velocity 136*a-c* may include a velocity signal. In some embodiments, calculating a velocity 136*a-c* and/or velocity signal for each spatial coordinate of the at least a position signal 118 of the optimal lead 128, computing, using the cardiac compensator 132, a velocity magnitude 138 as a function of the velocity 136*a-c* for all spatial coordinates, determining, using the cardiac compensator 132, a first temporal datum 140 corresponding to a first minimum velocity 142 and a second temporal datum 144 corresponding to a second minimum velocity 146 as a function of the at least a potential signal 110 associated with the least a position signal 118 of the optimal lead 128, and plotting, using the at least a potential signal 110 from the at least an electrode 108 of the optimal lead 128, a distribution 148 as a function of the at least a position signal 118 and the second temporal datum of the second minimum velocity 146. In some embodiments, distribution 148 may be plotted as a function of the position signal 118. In some embodiments, distribution 148 may represent position values corresponding to the plurality of position data. In some embodiments, processor 102 may be configured to determine, as a function of velocity magnitude of the at least a velocity signal, a plurality of velocity minima, representing local minimum velocity values, and a corresponding plurality of temporal data, representing times of the local minimum velocity values. In some embodiments, determining the plurality of velocity minima includes searching the velocity signal within a temporal envelope. For example, in some embodiments, processor may find local minima for the temporal envelope. For example, in some embodiments, processor may find only minima that occur within the temporal envelope. As used in this disclosure, a "cardiac compensator" is a device, system, or algorithm designed to account for or adjust signals, measurements, or movements affected by the natural motion of the heart during its beating cycle. Without limitation, the purpose of the cardiac compensator 132 is to reduce or eliminate the impact of cardiac motion 134, such as during imaging, catheter 106 navigation, or signal processing, thereby providing more accurate results or enabling precise interventions. In a non-limiting example, the cardiac compensator 132 may use real-time data collected on heartbeats to adjust for the motion of the heart during an electrophysiology study, ensuring that measurements are taken only during periods of minimal motion or applying corrections to signals distorted by the heart's movement. Continuing, by compensating the cardiac motion 134, medical devices or systems may maintain accuracy despite the constant rhythmic movement of the heart. As used in this disclosure, "cardiac motion" is the natural movement of the heart as it contracts and relaxes during the cardiac cycle. In a non-limiting example, the cardiac motion 134 may include the rhythmic beating that results from the coordinated contraction of the heart muscles. Without limitation, the cardiac motion 134 may involve both the mechanical movement of the heart's chambers (such as during systole and diastole) and the electrical signals that trigger these movements. Without limitation, the cardiac motion 134 may affect various medical procedures, such as imaging, catheter 106 placement, and signal acquisition. Continuing, the cardiac motion 134 of the heart may cause distortion in measurements or create challenges in maintaining the precision of instruments used during procedures.

With continued reference to FIG. 1, as used in this disclosure, "velocity magnitude" refers to the scalar quantity that represents the speed of an object without regard to its direction of motion. It is the absolute value of the velocity vector, which combines both the speed and direction. Velocity magnitude 138 is simply the rate at which an object is moving and is expressed as a positive number, typically in units such as meters per second (m/s). In a non-limiting example, if a catheter 106 moves at 2 meters per second through a patient's body, the velocity magnitude 138 would be 2 m/s, without considering the direction of movement. As used in this disclosure, a "temporal datum" is a specific point in time associated with an event, signal, or measurement. Without limitation, the temporal datum may provide a reference for when a particular action or occurrence takes place within a process. In a non-limiting example, a temporal datum may correspond to the exact moment a signal is recorded or a minimum velocity is reached during a procedure. As used in this disclosure, a "minimum velocity" is the lowest speed achieved by an object (such as a catheter 106 or another instrument) within a given time period. Continuing, the minimum velocity may represent the point at which the catheter 106 movement is slowest but still occurring. In a non-limiting example, the minimum velocity may be the slowest rate of movement of the catheter 106 between heartbeats. A distribution may include a mathematical representation or plot that shows the range and frequency of data points over a given period or range. In a non-limiting example, the distribution 148 may visually represent how the signals vary across different positions and times, providing insight into the behavior of the system.

With continued reference to FIG. 1, calculating the velocity 136a-c of each spatial coordinate may be a function of computing a temporal derivative 150a-c for each spatial coordinate. In some embodiments, calculating the velocity 136a-c of each spatial coordinate may be a function of computing a temporal derivative 150a-c of the at least a position signal. As used in this disclosure, a "temporal derivative" is the rate of change of a quantity with respect to time. In a non-limiting example, the temporal derivative 150a-c may measure how a value changes over a small increment of time, effectively providing the velocity 136a-c or speed of that change. Continuing, computing the temporal derivative 150a-c for each spatial coordinate may involve determining how the position of the catheter 106 changes over time along each axis (X, Y, and Z). Continuing, this calculation helps to determine the velocity 136a-c of the catheter 106, as velocity 136a-c is the derivative of position with respect to time.

With continued reference to FIG. 1, computing the velocity magnitude 138 may include squaring, using the at least a processor, the velocity 136a-c for each spatial coordinate, summing, using the at least a processor, the velocity 136a-c for each spatial coordinate, and calculating, using the at least a processor, a square root of the sum. Without limitation, the velocity 136a-c for each spatial coordinate, such as, the First spatial coordinate 122, the second spatial coordinate 124, and the third spatial coordinate 126 (e.g., X, Y, and Z) is squared, to remove negative values and ensures that all velocities contribute positively to the magnitude. Continuing, the squared velocities for each spatial coordinate may be summed together. Continuing, the square root of this sum is calculated, providing the velocity magnitude 138, which may represent the overall speed of the catheter 106 without considering its direction.

With continued reference to FIG. 1, the at least a processor may be configured to generate an envelope 152 for the at least an electrode 108 as a function of the distribution 148. As used in this disclosure, an "envelope" is a boundary or continuous surface created by connecting specific points. In a non-limiting example, the envelope 152 may include the saved X, Y, and Z measurements taken at times of minimum velocity during each heartbeat. Continuing, the envelope 152 may describe stable positions for each electrode 108, effectively defining a smooth surface that can be used to mitigate the impact of the cardiac motion 134 on measurements, providing a consistent reference free from movement artifacts. In a non-limiting example, and with continued reference to FIG. 1, the processor may generate the envelope 152 for an electrode 108 based on the distribution 148 of positional measurements recorded during specific points within each cardiac cycle. Specifically, without limitation, the processor may identify times of minimum velocity for the electrode's X, Y, and Z coordinates, times where cardiac motion 134 has the least influence on the electrode's positioning. Continuing, by saving the minimum velocity for each spatial coordinate over multiple heartbeats and connecting the points, the processor may generate an envelope 152 that represents a stable position for the electrode 108 across the cardiac cycle. Without limitation, this envelope 152 then serves as a boundary or continuous surface that effectively "averages" the electrode's position, filtering out the minor positional shifts caused by cardiac motion 134.

With continued reference to FIG. 1, plotting the distribution 148 may include filtering the at least a potential signal 110 using the envelope 152 as a boundary. In a non-limiting example, once the envelope 152 has been established based on the stable X, Y, and Z positional measurements taken at minimum velocity times during each heartbeat, the envelope 152 may serve as a reference frame. Continuing, this reference frame may allow the processor to isolate the relevant potential signal 110 by filtering out any fluctuations outside the envelope 152 boundary. For instance, without limitation, if the electrode's measurements experience minor shifts due to cardiac motion 134, the envelope 152 boundary may help to exclude the artifacts. Continuing, the processor may apply the envelope 152 boundary to allow only the potential signal 110 that aligns within the stable reference, thereby enhancing the quality and consistency of the distribution 148. Without limitation, the filtered distribution 148 may then be visualized as a more accurate representation of the potential signal 110 over time, free from the effects of cardiac motion-induced interference.

With continued reference to FIG. 1, the second minimum velocity 146 may characterize a maximum relaxation of the cardiac motion 134. As used in this disclosure, "maximum relaxation" is the phase in the cardiac cycle when the heart experiences a release of tension following contraction. Without limitation, during the maximum relaxation the aortic valve may have opened, allowing blood to be expelled from the ventricles into the aorta, reducing ventricular pressure. Continuing, the maximum relaxation may correspond to a second peak in velocity as the heart transitions from contraction to relaxation, facilitating the movement of blood out of the ventricles. Without limitation, at this time, the velocity 136a-c of cardiac motion 134 reaches a maximum as the heart shifts into a state of relaxation, allowing for the expulsion of blood and the return of the ventricles to a less contracted state.

Still referring to FIG. 1, processor 102 is configured to compensate, using a respiratory compensator 154, respiratory motion 156. As used in this disclosure, a "respiratory compensator" is a device, system, or algorithm designed to adjust or correct for the effects of respiratory motion 156 on signals, measurements, or instruments during medical procedures. Without limitation, the purpose of the respiratory compensator 154 is to reduce or eliminate the impact of a patient's breathing, which can cause movement that interferes with the accuracy of medical instruments or data acquisition. In a non-limiting example, the respiratory compensator 154 may filter out motion artifacts caused by breathing to maintain precise measurements. As used in this disclosure, "respiratory motion" refers to the natural movement of the body, organs, or internal structures caused by the act of breathing. Without limitation, the respiratory motion 156 may include the expansion and contraction of the lungs, chest, and abdomen as air is inhaled and exhaled. In a non-limiting example, the respiratory motion 156 may affect the stability of instruments or distort measurements, making it necessary to account for or compensate for this motion to achieve accurate results.

Still referring to FIG. 1, a respiratory compensator 154 is used to compensate for respiratory motion 156 by interpolating, using the respiratory compensator 154, the distribution 148, determining, using the respiratory compensator 154, a respiratory phase 158 by analyzing a rate of change 160 of the distribution, and extracting the respiratory motion during an expiration phase 162 of the respiratory phase 158. In some embodiments, respiratory compensator 154 may be configured to determine a respiratory phase 158 my analyzing a rate of change of position values of distribution 148. In some embodiments, extracting the respiratory motion as a function of respiratory phase 158 may include gating at least a potential signal. In some embodiments, extracting the respiratory motion as a function of the respiratory phase may include one or more of interpolating and smoothing distribution 148 representing position values corresponding to the plurality of temporal data which correspond to the plurality of velocity minima. In some embodiments, smoothing and interpolation of distribution 148 may be further described with reference to FIG. 4. As used in this disclosure, a "respiratory compensator" is a system or device designed to mitigate the effects of respiratory motion on a given processor. In an embodiment, the respiratory compensator may analyze respiratory patters, estimate motion parameters, and adjust data based on motion related to breathing. As used in this disclosure, a "respiratory phase" is a specific stage within the respiratory cycle. In an embodiment, the respiratory phase 158 may include an inspiration phase, an expiration phase 162 and/or a period with minimal airflow. In an embodiment, an inspiration phase may correspond to an inhalation phase of the respiratory cycle. In an embodiment, an expiration phase 162 may correspond to the exhalation phase of the respiratory cycle. In an embodiment, a period with minimal airflow may be related to pauses between breaths in the respiratory cycle. As used in this disclosure, a "rate of change" is a measure of how quickly a variable changes over time. In a non-limiting example, the rate of change 160 may include the speed at which a signal amplitude or distribution changes over time. In an embodiment, the rate of change 160 may be related to the speed at which the respiratory-related phases evolve over time during the breathing cycle. As used in this disclosure, an "expiration phase" is the part of the respiratory cycle during which air is expelled from the lungs. In an embodiment, the expiration phase 162 may be characterized by a decrease in lung volume and changes in associated cardiac signals such as airflow or thoracic pressure.

With continued reference to FIG. 1, the processor may be configured to generate an electromechanical signal visualization 164 may include the at least a potential signal 110 corresponding to the at least a position signal 118, wherein a downstream device 166 displays the electromechanical signal visualization 164 through a graphical user interface 168. As used in this disclosure, "electromechanical signal visualization" is the graphical representation of signals that capture both electrical and mechanical activities within a system. In a non-limiting example, the electromechanical signal visualization 164 may include displaying both the at least a potential signal 110, such as the electrical impulses of the heart, and the at least a position signal 118, such as mechanical responses (like ventricular contractions) of the heart over time. Continuing, the combined visualization may allow for a comprehensive analysis of the relationship between the apparatus' electrical activity and its mechanical response. Without limitation, the electromechanical signal visualization 164 may facilitate diagnostic and therapeutic assessments by providing insights into how electrical signals correlate with mechanical motion or function. As used in this disclosure, "downstream device" is a device that accesses and interacts with apparatus 100. For instance, and without limitation, downstream device 166 may include a remote device and/or apparatus 100. In a non-limiting embodiment, downstream device 166 may be consistent with a computing device as described in the entirety of this disclosure. Without limitation, the downstream device 166 may include a display device. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user-interface (GUI) to a user, wherein a user may interact with a GUI. In some cases, a user may view a GUI through display. Additionally, or alternatively, processor 102 be connected to display device. In one or more embodiments, transmitting the electromechanical signal visualization 164 may include displaying the electromechanical signal visualization 164 at display device using a graphical user interface 168. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 168. For example, links to decentralized platforms as described in this disclosure may be incorporated using icons. Using an icon may be a fast way to open documents, run programs etc. because clicking on them yields instant access.

With continued reference to FIG. 1, in an embodiment, extracting, using the cardiac compensator, cardiac motion from the at least a position signal may include receiving an external signal from an external sensor, identifying, as a function of the external signal, a plurality of temporal values each associated with an external signal feature, and plot, using the at least a position signal, a distribution, representing position values corresponding to the plurality of temporal values. As used in this disclosure, an "external signal" is a signal generated using a sensor that is outside of the patient body. In a non-limiting example, the external signal may include various biometric markers collected during a surgery, such as, without limitation, ECG data, which represents the electrical activity of the heart and helps in monitoring cardiac function; respiratory data, which includes measurements like breathing rate, tidal volume, and airflow patterns to assess pulmonary status; blood pressure signals, intravenous pressure signals, intravenous pump signals, blood pressure signals which continuously track systolic and diastolic values to ensure hemodynamic stability; and other biometric markers, such as pulse oximetry readings for oxygen saturation and body temperature, among additional parameters. In an embodiment, the external signals may be integrated to provide a comprehensive view of the patient's physiological state, thereby enabling more informed and timely clinical decisions during the procedure. Without limitation, the external signal may be collected via a network of sensors attached to the patient, such as chest electrodes for ECG data, respiratory belts or flow sensors for breathing patterns, and either non-invasive cuffs or invasive catheters for blood pressure readings. Continuing, these sensors may convert physiological activity into electrical or digital signals that are then transmitted to a central processing unit. Within this unit, the collected data may be analyzed to identify the characteristic patterns of cardiac and respiratory cycles, for instance, pinpointing the R-wave peaks in the ECG to map out the timing of heart contractions, or tracking the rhythmic expansion and contraction captured by the respiratory sensors. Continuing, advanced signal processing techniques, such as adaptive filtering, Fourier transform-based analysis, or model-based subtraction, and others described herein may then be applied to these identified patterns. Without limitation, using the known periodic signatures of the cardiac or respiratory movements as reference signals, the apparatus 100 may subtract or filter out these motion components from the overall data. Continuing, this process may result in a refined dataset that minimizes motion artifacts, thereby isolating the core information needed for further analysis or imaging enhancements during the surgical procedure.

With continued reference to FIG. 1, processor 102 may be further configured to identify, as a function of the external signal, a plurality of temporal values each associated with an external signal feature. As a non-limiting example, processor 102 may be configured to detect features from an external signal such as an ECG. In some embodiments, processor 102 may be configured to detect an R-wave in an ECG. As a non-limiting example, processor 102 may identify temporal values associated with an R-wave. As a non-limiting example, processor 102 may identify temporal values associated with the feature. As a non-limiting example, processor 102 may identify temporal values within a temporal range of the R-wave. For example, temporal range may include 1 ms to 20 ms. For example, temporal range may include 3 ms to 10 ms. For example temporal range may include 5 ms. As a non-limiting example, processor 102 may identify temporal values within a temporal range of the feature. The associated temporal values of the position signal may be plotted. This may be used by the cardiac compensator 132 and/or respiratory compensation 154 as discussed throughout the rest of this disclosure.

With continued reference to FIG. 1, extracting the respiratory motion may include computing a complimentary motion profile based on motion data and applying the complimentary motion profile to the at least a position signal. In some embodiments, extracting the cardiac motion may include computing a complimentary motion profile based on motion data and applying the complimentary motion profile to the at least a position signal. In some embodiments, motion data may be received from and/or collected by an ultrasound sensor. In some embodiments, motion data may be collected from an ultrasound. In some embodiments, motion data may be collected from a lung ultrasound. In some embodiments, motion data may be collected from a cardiac ultrasound. In some embodiments, motion data may be collected from a Transthoracic Echocardiogram (TTE). In some embodiments, motion data may be collected from Transesophageal Echocardiography (TEE). In some embodiments, motion data may be collected from a Point of Care Ultrasound (POCUS). In some embodiments, motion data may be collected from an echocardiogram. In some embodiments, motion data may be collected from an intracardiac echocardiogram (ICE). As used in this disclosure, a "complimentary motion profile" is a computational framework designed to counteract unwanted motion artifacts or distortions in data by generating a compensatory motion signal. Without limitation, the complimentary motion profile may be employed to mitigate and or reduce the cardiac motion 134 and the respiratory motion 156. The complimentary motion profile may be derived from auxiliary motion sensors, such as accelerometers and gyroscopes, which may continuously capture cardiac motion 134 and respiratory motion 156 and generate a corresponding motion dataset. In some embodiments, respiratory motion 156 may be determined from ultrasound data. The corresponding motion dataset may then be processed to construct a complimentary motion profile that mathematically represents the expected motion-induced disturbances affecting the ECG signal. In an embodiment, the complimentary motion profile may be generated using machine learning algorithms or signal processing techniques, such as adaptive filtering, wavelet transforms, or independent component analysis as described herein, to identify and characterize the frequency and amplitude of motion artifacts. Without limitation, the complimentary motion profile may then be applied to the raw ECG signal through an inverse transformation or real-time subtraction method, effectively canceling out motion-related noise while preserving the integrity of the cardiac signal. Additionally and or alternatively, the complimentary motion profile may continuously update based on feedback loops that monitor residual noise, allowing for adaptive refinement in response to varying motion conditions. In another embodiment, the complimentary motion profile may operate in conjunction with predictive modeling techniques to anticipate motion artifacts before they fully manifest in the ECG signal. Without limitation, by analyzing historical motion data and employing predictive analytics, the complimentary motion profile may proactively adjust filtering parameters, improving the robustness of ECG readings in dynamic environments. Continuing, this approach may be particularly beneficial in applications such as wearable ECG monitoring, where continuous movement can introduce significant signal degradation. Without limitation, by incorporating a complimentary motion profile, ECG systems may achieve enhanced signal clarity, enabling more reliable diagnostics and real-time cardiac monitoring in both clinical and ambulatory settings. In some embodiments, processor 102 may be configured to perform signal processing techniques on cardiac motion 134 and respiratory motion 156 to determine complementary motion profile. In some embodiments, signal processing techniques may include a fast Fourier transform. In some embodiments, signal processing techniques may include a discrete Fourier transform. For the purposes of this disclosure, a "Fourier transform" is a mathematical operation that transform a signal in the time domain into a frequency domain representation. This may allow, for example, for the determination of the complimentary motion profile by selecting frequencies in the motion data to filter out.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

EXEMPLARY EMBODIMENTS

Motion Compensation Motivation

In some embodiments, apparent motion of heart may have a number of causes. Heart motion may be caused by cardiac motion of a particular heart chamber, e.g., cardiac contraction during systole and cardiac filling during diastole. In some cases, apparent motion may result from guided movement of catheter tip, for example by an electrophysiologist. In some cases, apparent cardiac motion may be cause by respiration, e.g., inspiration and expiration.

In some embodiments, motion may be specific and/or different at each electrode. For instance, in some cases, motion may be asynchronous between different hear chambers and/or at different locations within a heart chamber (e.g., right ventricle, left ventricle, right atrium, and/or left atrium) or along a heart surface (e.g., epicardium). In some cases, heart movement may be dependent on activation sequence (e.g., normal sinus rhythm, ventricular tachycardia, atrial fibrillation, and atrial flutter) and/or consequential mechanical sequence. In some cases, cardiac motion may be represented as a vector, with both magnitude and direction. Accordingly, in some versions, cardiac motion may behave differently, even out of phase for each axis (x, y, z).

In some embodiments, cardiac mapping that yields smooth, stable surfaces for visualizing all electrophysiology metrics may be beneficial; this function may be impeded by cardiac motion of all kinds. Exemplary electrophysiology metrics include, without limitation, peak-to-peak (P2P)-voltage, local activation times (LATs)-activation sequence, fractionation, conduction velocity, and the like.

In some embodiments, heart motion (e.g., cardiac and/or respiratory motion), without correction, can produce apparent surface location variance of up to +0.5 mm, 1 mm, 2 mm, 5 mm, and/or 10 mm. In some embodiments, heart motion correction according to this present disclosure may be used with impedance-based localization techniques and/or magnetic-based localization techniques to localize electrode positions.

Approach 1

In some embodiments, a first approach of using minimum electrode velocity to correct for heart motion does not correct both cardiac and respiratory motion.

According to a first approach, in some embodiments, cardiac motion compensation is performed by an algorithm that assigns a geometric coordinate after up-sampling geometric points to match a sample rate of bio electrical signals.

Figure 2:
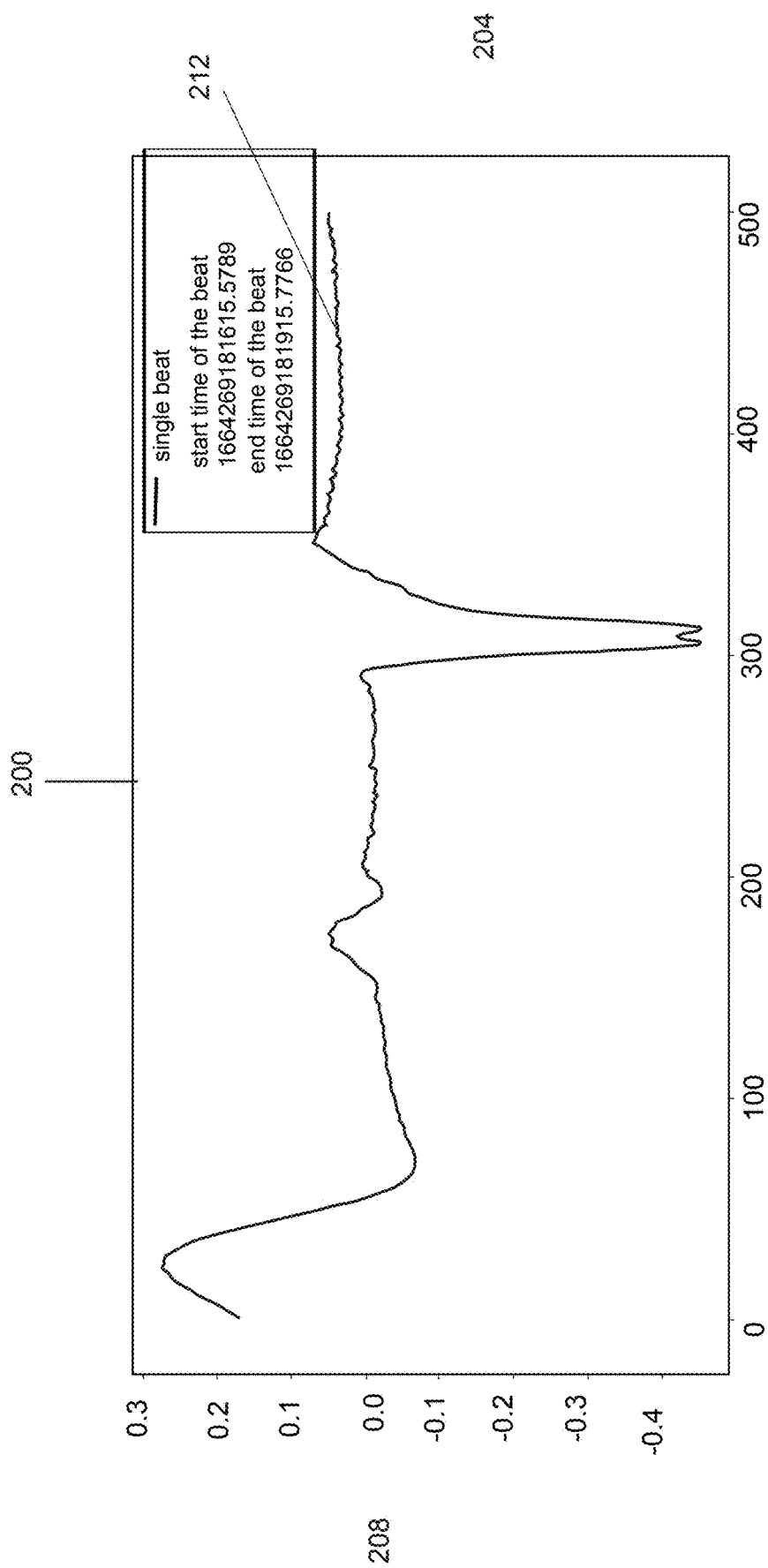
FIG. 2 is a graph showing heart motion over time according to some embodiments.

Referring now to FIG. 2, first approach may be performed according to the following. A timestamp and/or a position and/or voltage value may be collected for every single beat 212. FIG. 2 illustrates a graph 200 showing heart position, along a vertical axis 208 over time, shown along a horizontal axis 204. In some cases, a number of position coordinates may be checked to ensures that there are enough position coordinates during and prior/subsequent to a heartbeat, up to a certain threshold e.g., 20 milliseconds. In some cases, having these additional timed datapoints ensures that there are at least two position coordinates to up sample within a beat window. In some cases, linear interpolation may be used to up-sample a first two geometric coordinates of a beat, for example at one-millisecond intervals to match an electrical sampling rate (e.g., ~1 Khz). In some cases, algorithm may compute velocity between these instances of up-sampled coordinates to find a slowest (i.e., minimum/lowest value) velocity and its associated geometric coordinate at that time. In some cases, this geometric (position) coordinate for minimized catheter tip velocity may be assigned coordinate for the beat.

Figure 3:
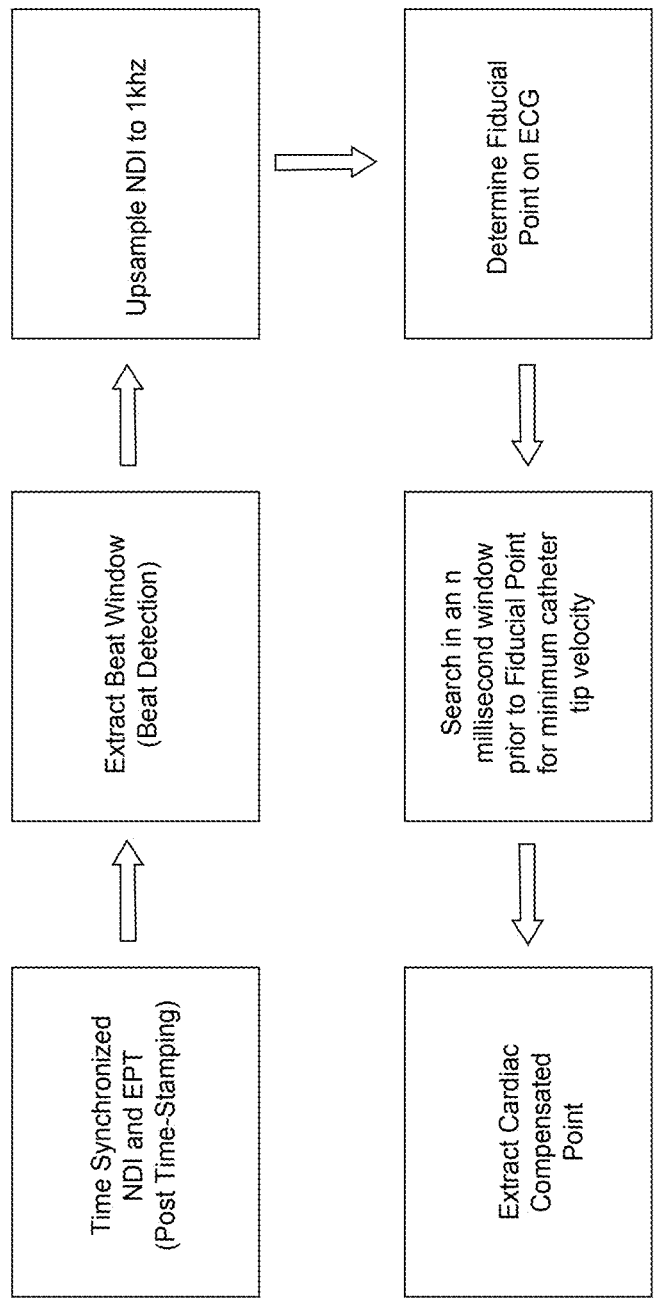
FIG. 3 is a flow diagram showing an approach for compensation for cardiac motion according to some embodiments.

In some embodiments, an onset point of a template electrocardiogram (ECG) or intracardiac electrogram (EGM) (if intracardiac reference) may be used as a fiducial point to determine a search window for minimum catheter tip velocity. Referring now to FIG. 3, a data pipeline flow chart 300 is illustrated. Additional disclosure related to the present disclosure and especially beat detection, heart motion compensation, and heartbeat template matching may be described in the following patent applications (1), U.S. patent application Ser. No. 17/805,687, filed on Jun. 6, 2022, titled "REMOVAL OF CARDIAC AND RESPIRATORY MOTION FROM GEOMETRIC POINTS ACQUIRED FROM CARDIAC CATHETER ELECTRODES"; (2), U.S. patent application Ser. No. 18/641,254, filed on Apr. 19, 2024, titled "METHOD AND SYSTEM FOR DETERMINING POSITION OF MEDICAL DEVICE"; and (3), U.S. patent application Ser. No. 18/788,888, filed on Jul. 30, 2024, titled "APPARATUS AND METHOD FOR AUTOMATIC BEAT DETECTION DURING ELECTROANATOMIC MAPPING," all of which are incorporated by reference herein in their entirety.

Figure 4:
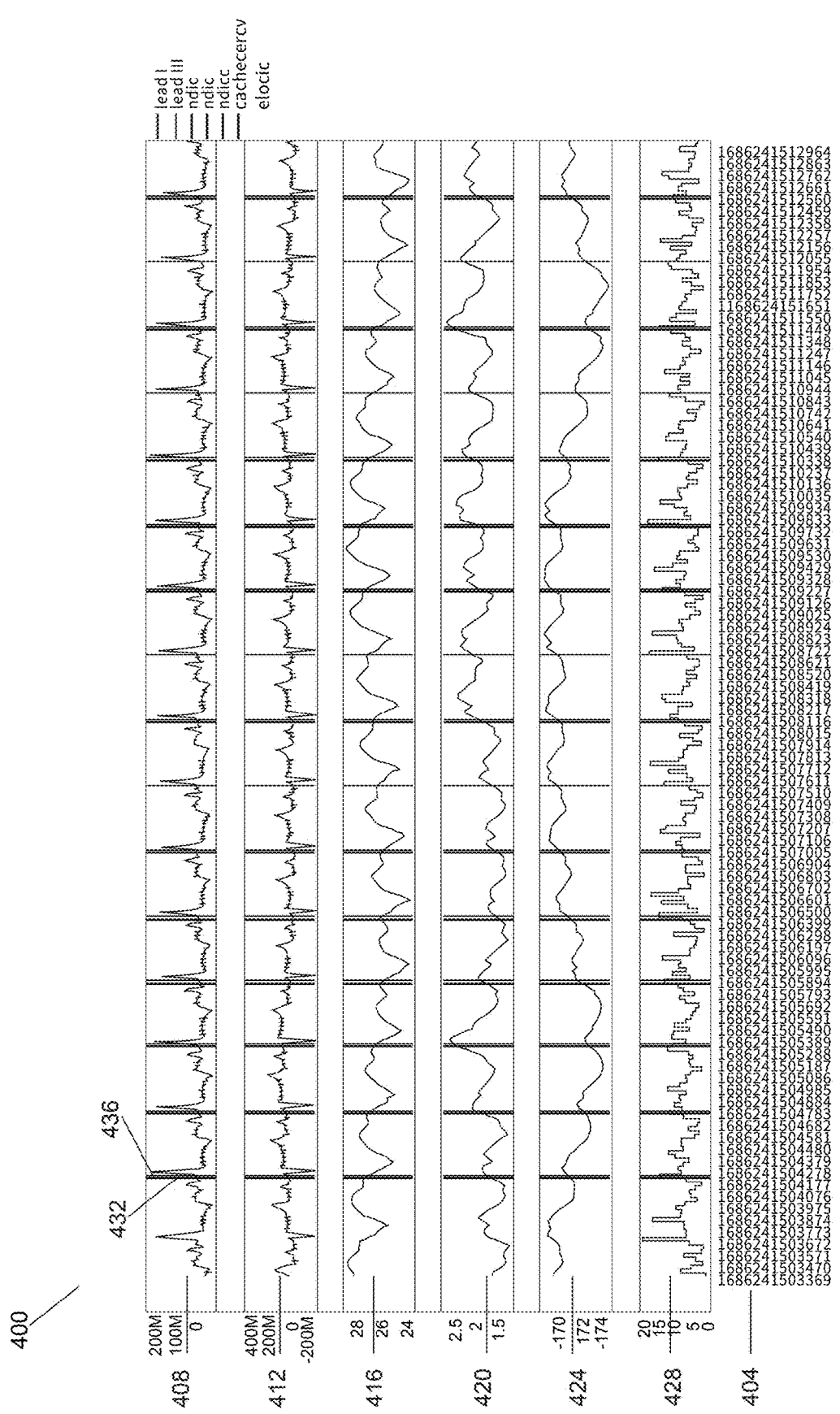
FIG. 4 is a graph showing synchronized cardiac position, velocity, and potential data according to some embodiments.

Referring now to FIG. 4, a graph 400 showing electrical and position information over time is shown. Graph 400 has a shared (i.e., synchronized) horizontal axis 404 representing time. Graph 400 has six distinct vertical axes representing: (1) potential at lead one 408; (2) potential at lead three 412; (3) catheter position in x-axis 416; (4) catheter position in y-axis 420; (5) catheter position in z-axis 424; and (6) catheter velocity 428. A pair of time synched lines represent (for each heartbeat) a cardiac compensated point 432 and shortly thereafter an onset point 436 (e.g., fiducial point).

In some embodiments, system may calculate time between subsequent R-waves (i.e., R-wave to R-wave interval or R-R interval). In some versions, the system may allow a user input (e.g., user configurable setting) to select n % of cycle length (e.g., R-R interval) for cardiac compensated point. In some embodiments, system may determine R peak, maximum amplitude of R-wave, for both atrial and ventricular mapping.

Approach 2

In some embodiments, heart motion compensation, which compensates both cardiac and respiratory motion, may be performed according to another approach described in greater detail below. Minimum electrode velocity may be determined by finding times where a first derivative of geometric point measurements are at a local minima; in some cases, these times may be used for cardiac compensation. In some cases, interpolated and smoothed electrode positions (e.g., xyz positions) at times of diastole peaks may be used to compensate for respiratory motion.

Figure 5:
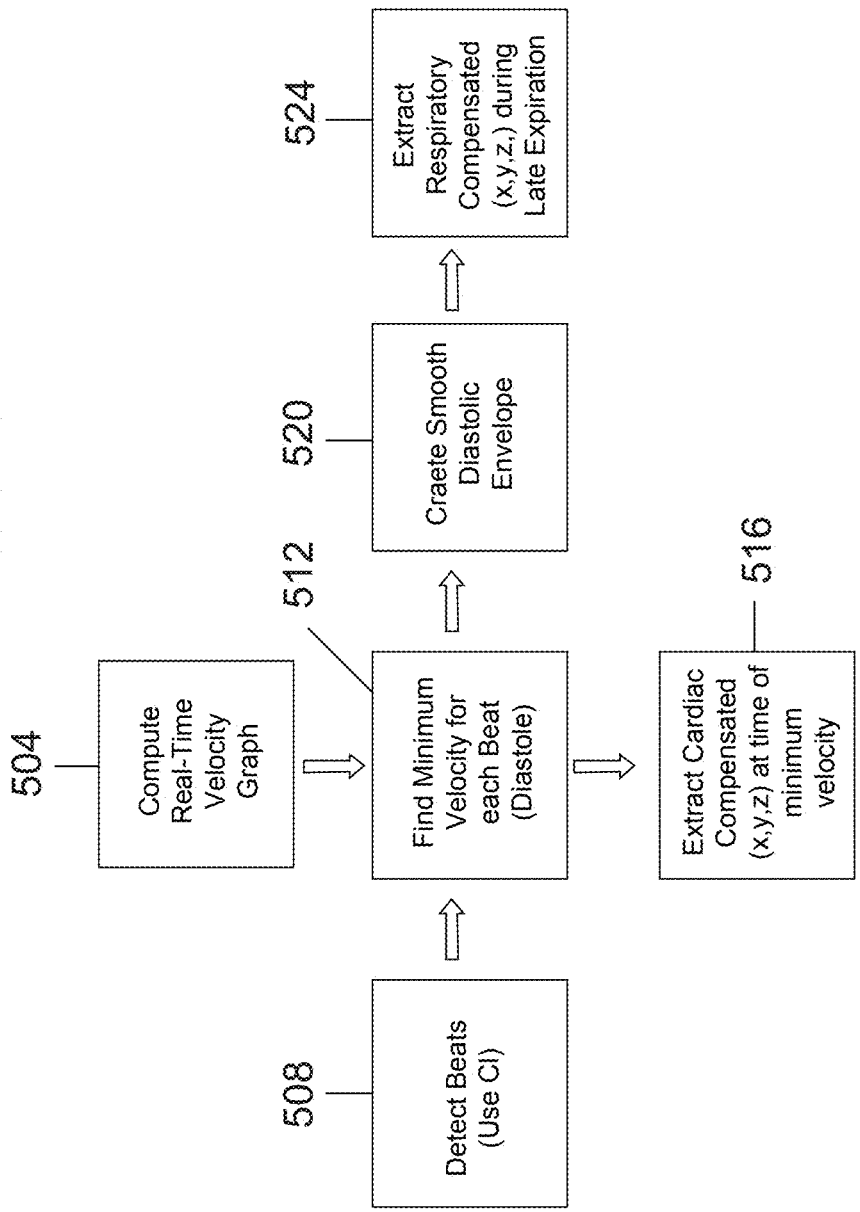
FIG. 5 is a flow diagram showing an approach for compensating for respiratory and cardiac motion according to some embodiments.

Referring now to FIG. 5, a flowchart 500 depicts steps according to a motion compensation approach that compensates for both cardiac and respiratory motion. In some cases, motion compensation may include, 504, computing velocity of catheter and or electrode as a function of measure geometric positions. Using Cycle Length to determine a window 508, system may search for a minimum catheter tip velocity per beat 512. In some cases, to find minimum catheter tip velocity, minimum catheter tip velocity may be sought between adjacent peaks in a velocity graph; this may be where cycle length 508 serves as an input to the algorithm. Cardiac compensated position at time of minimum velocity (during each beat) may be extracted 516. In some versions, a diastolic envelope using multiple minimum catheter tip velocity points may be created 520. In some cases, rate of change within an envelope may be used to determine inspiration/expiration cycles. System may then block acquisition during inspiration 524 (during high rate of change on envelope). Instead, system may acquire during expiration, if Respiration Gating is "On."

Figure 6A:
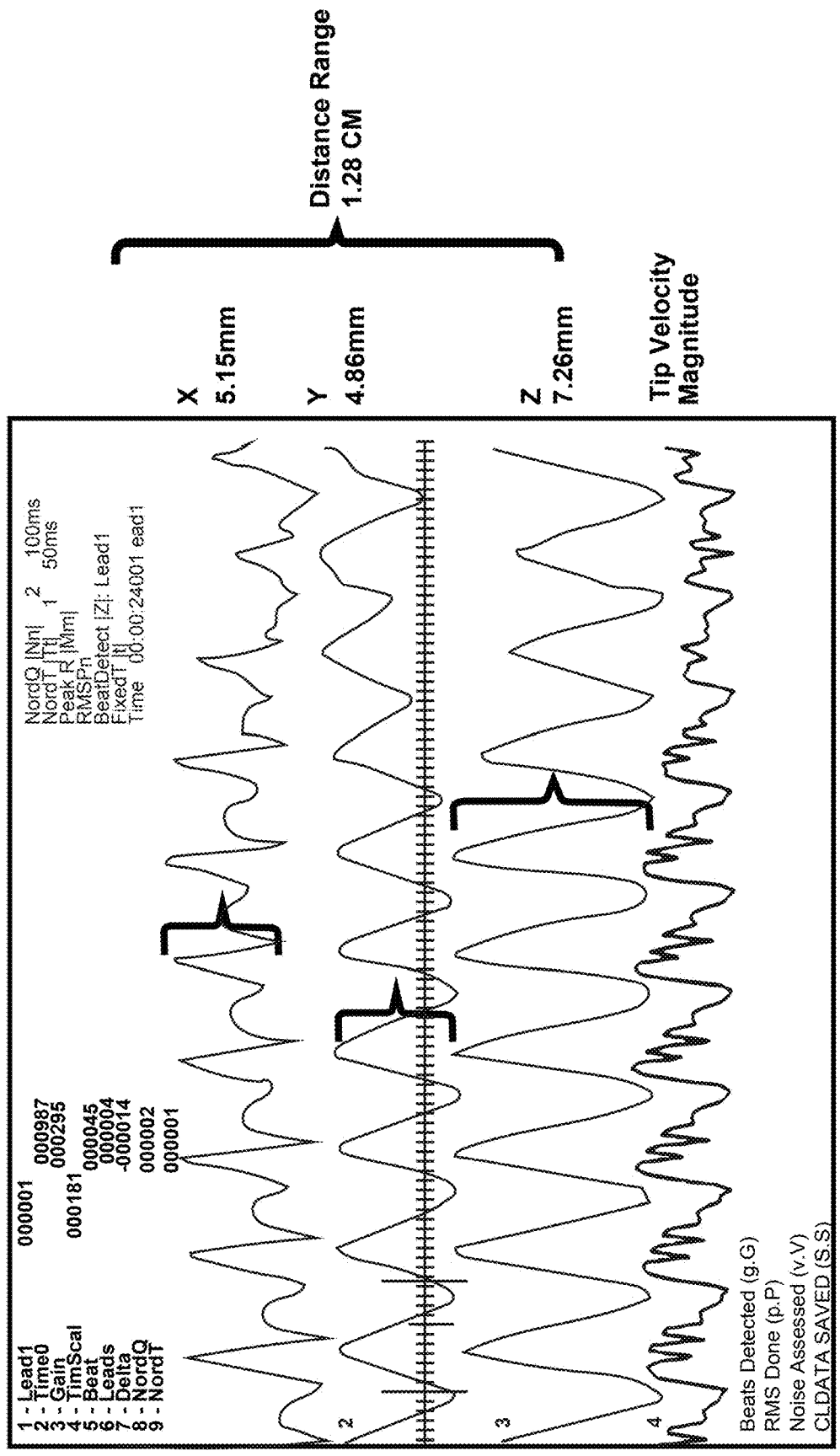
FIG. 6A is a graph showing heart motion over a first time according to some embodiments.
Figure 6B:
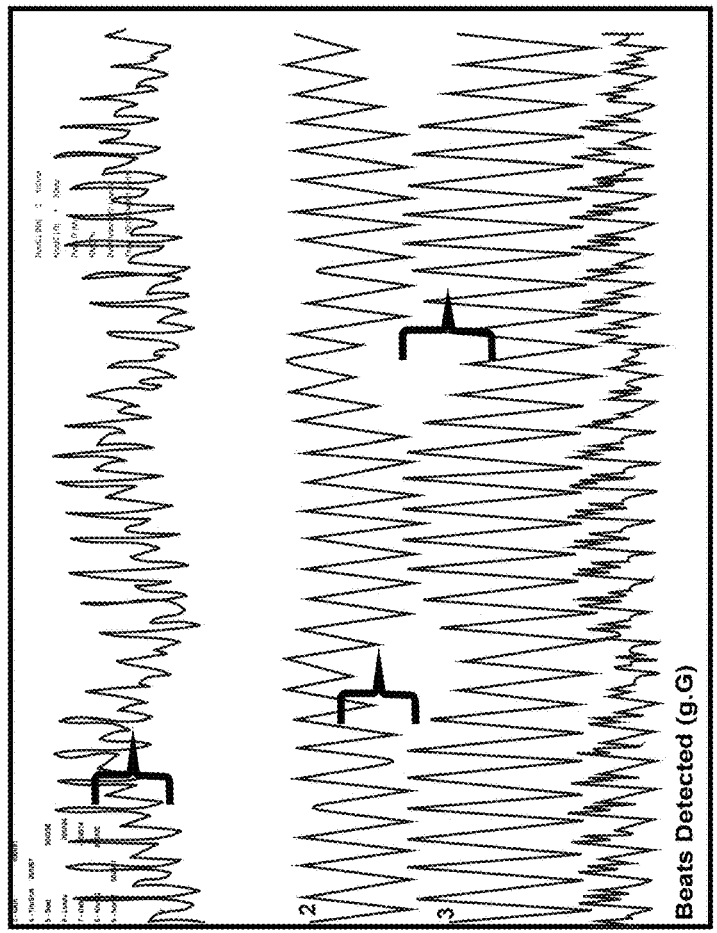
FIG. 6B is a graph showing heart motion over a second time according to some embodiments.

Referring now to FIGS. 6A-C, graphs 600a-c show heart motion data over time. FIGS. 6A-C show x, y, and z position as well as velocity on vertical axes 604a-c and time on horizontal axes 608a-c. FIG. 6A illustrates a ~4 second time period with annotations that show distance excursions representing cardiac motion between times of tip velocity local minima. FIG. 6B illustrates a ~13 second time period with annotations that show distance excursions representing respiratory motion. FIG. 6C illustrates the same ~13 second time as FIG. 6B, but with additional annotations representing end of diastole 640, peak inspiration 644, position data captured at diastolic envelope 648, and smoothed position information 652.

Figure 7:
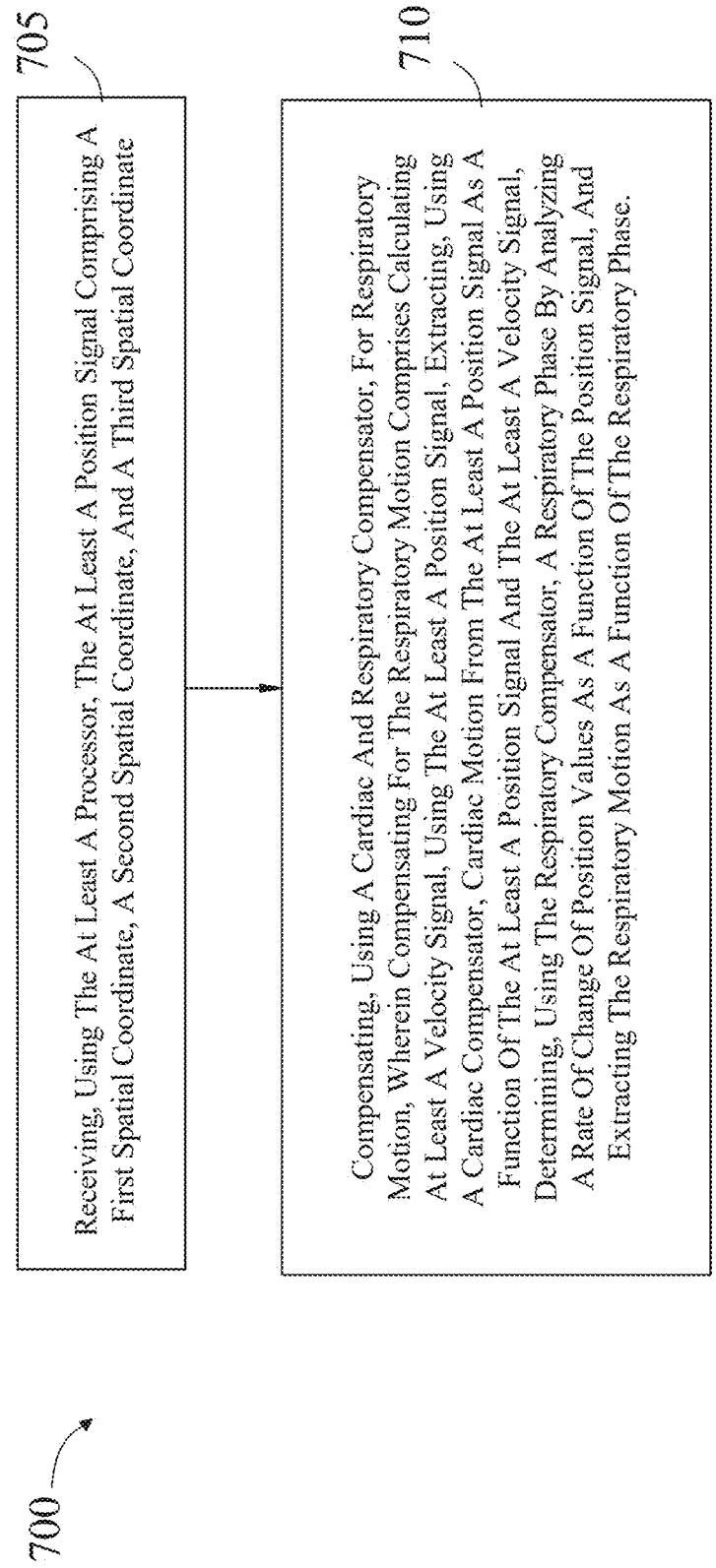
FIG. 7 is a block diagram of an exemplary method to mitigate cardiac motion and respiratory motion on geometric measurements of cardiac electrodes.

Referring now to FIG. 7, a flow diagram of an exemplary method 700 to mitigate motion cardiac and respiratory motion on geometric measurements of cardiac electrodes is illustrated. At step 705, method 700 includes receiving, using the at least a processor, the at least a position signal comprising a first spatial coordinate, a second spatial coordinate, and a third spatial coordinate. Without limitation, the apparatus further may include at least a localization system which may include an electromagnetic localization system. In an embodiment, the potential signal may include an electrogram (EGM) signal. This may be implemented as described and with reference to FIGS. 1-6.

Still referring to FIG. 7, at step 710, method 700 includes compensating, using a cardiac and respiratory compensator, for respiratory motion, wherein compensating for the respiratory motion comprises calculating at least a velocity signal, using the at least a position signal, extracting, using a cardiac compensator, cardiac motion from the at least a position signal as a function of the at least a position signal and the at least a velocity signal, determining, using the respiratory compensator, a respiratory phase by analyzing a rate of change of position values as a function of the position signal, and extracting the respiratory motion as a function of the respiratory phase. In an embodiment, calculating the at least a velocity signal may include computing a temporal derivative for of the at least a position signal. In an embodiment, the at least a processor may be further configured to determine, as a function of a velocity magnitude of the at least a velocity signal, a plurality of velocity minima, representing local minimum velocity values, and a corresponding plurality of temporal data, representing times of the local minimum velocity values, the at least a processor is further configured to plot, using the at least a position signal, a distribution, representing position values corresponding to the plurality of temporal data, and determining the respiratory phase comprises determining the respiratory phase by analyzing a rate of change of position values of the distribution. In an embodiment, determining the plurality of velocity minima may include searching the at least a velocity signal within a temporal envelope. In an embodiment, the at least a processor may be configured to generate an envelope for the at least an electrode as a function of the distribution. In an embodiment, extracting the respiratory motion as a function of the respiratory phase may include one or more of interpolating and smoothing the distribution representing position values corresponding to the plurality of temporal data which correspond to the plurality of velocity minima. In an embodiment, plotting the distribution may include filtering the at least a potential signal using the envelope as a boundary. In an embodiment, the processor may be further configured to generate an electromechanical signal visualization comprising the at least a potential signal corresponding to the at least a position signal, wherein a downstream device displays the electromechanical signal visualization through a graphical user interface. In an embodiment, extracting the respiratory motion as a function of the respiratory phase may include gating the at least a potential signal. In an embodiment, extracting, using a cardiac compensator, cardiac motion from the at least a position signal may include receiving an external signal from an external sensor, identifying, as a function of the external signal, a plurality of temporal values each associated with an external signal feature, and plot, using the at least a position signal, a distribution, representing position values corresponding to the plurality of temporal values. In an embodiment, extracting the respiratory motion may include computing a complimentary motion profile based on the at least a position signal and applying the complimentary motion profile to the at least a position signal. This may be implemented as described and with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
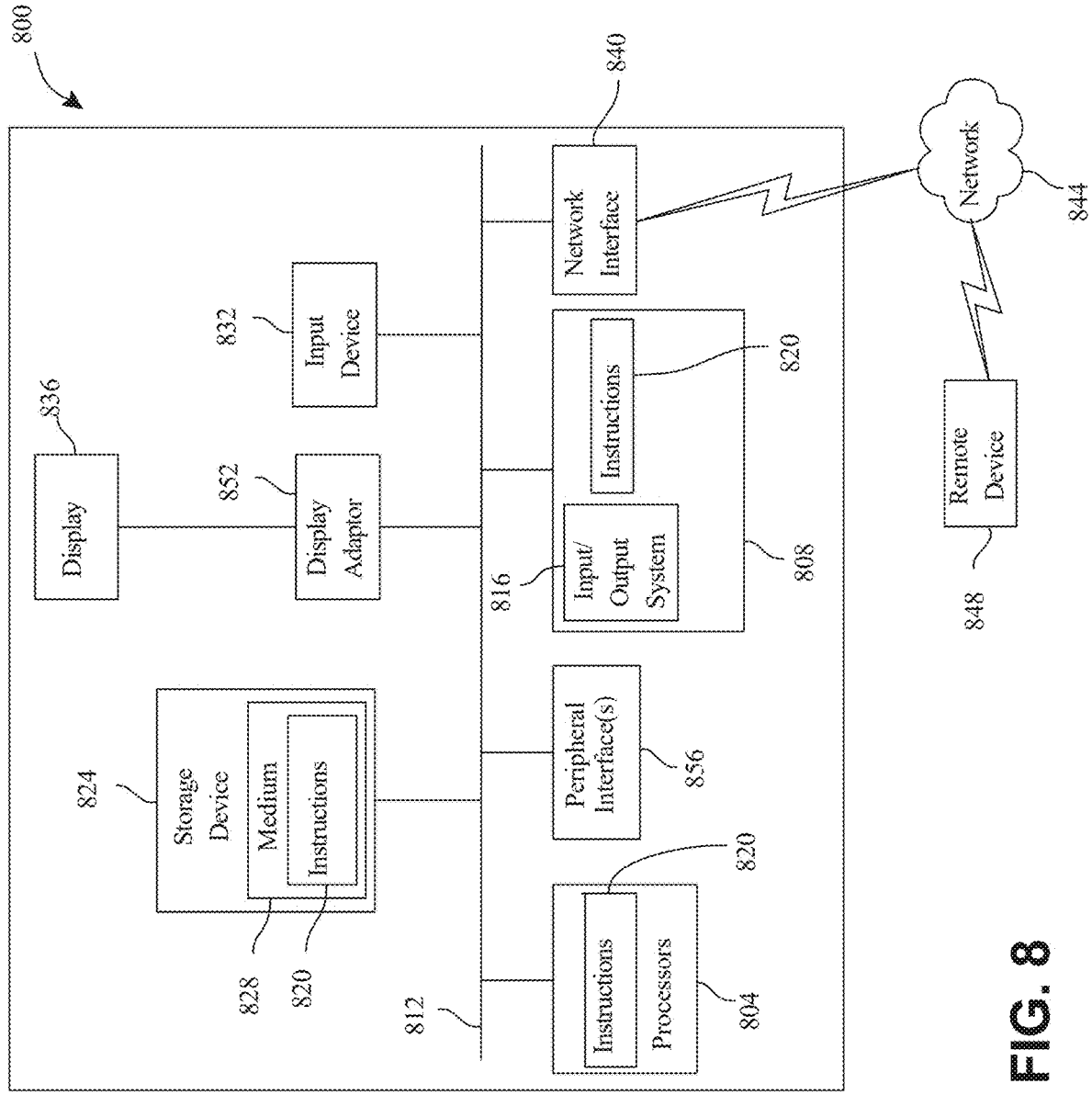
FIG. 8 is a block diagram of a computing system that can be used to implement any one or more of the methodologies disclosed herein and any one or more portions thereof.

FIG. 8 shows a diagrammatic representation of one embodiment of computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display device 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus to mitigate cardiac motion and respiratory motion on geometric measurements of cardiac electrodes, wherein the apparatus comprises:

at least a catheter configured for intracardiac use, the at least a catheter comprising at least an electrode configured to detect a cardiac phenomenon and output at least a potential signal, as a function of the cardiac phenomenon;

at least a localization system configured to detect at least a position signal as a function of a location of the at least a catheter; and at least a computing device, wherein the computing device comprises:
a memory; and
at least a processor communicatively connected to the memory, wherein the memory contains instructions configuring the at least a processor to:
receive, using the at least a processor, the at least a position signal comprising a first spatial coordinate, a second spatial coordinate, and a third spatial coordinate;
compensate, using a cardiac compensator and respiratory compensator, for motion, wherein compensating for respiratory motion comprises:
calculating at least a velocity signal, using the at least a position signal;
extracting, using the cardiac compensator, cardiac motion from the at least a position signal as a function of the at least a position signal and the at least a velocity signal;
determining, using the respiratory compensator, a respiratory phase by analyzing a rate of change of position values as a function of the at least a position signal; and
extracting the respiratory motion as a function of the respiratory phase.

2. The apparatus of claim 1, wherein the at least a localization system comprises an electromagnetic localization system.

3. The apparatus of claim 1, wherein the potential signal comprises an electrogram (EGM) signal.

4. The apparatus of claim 1, wherein calculating the at least a velocity signal comprises computing a temporal derivative for of the at least a position signal.

5. The apparatus of claim 1, wherein:
the at least a processor is further configured to determine, as a function of a velocity magnitude of the at least a velocity signal, a plurality of velocity minima, representing local minimum velocity values, and a corresponding plurality of temporal data, representing times of the local minimum velocity values;
the at least a processor is further configured to plot, using the at least a position signal, a distribution, representing position values corresponding to the plurality of temporal data; and
determining the respiratory phase comprises determining the respiratory phase by analyzing a rate of change of position values of the distribution.

6. The apparatus of claim 5, wherein determining the plurality of velocity minima comprises searching the at least a velocity signal within a temporal envelope.

7. The apparatus of claim 6, wherein plotting the distribution comprises filtering the at least a potential signal using the envelope as a boundary.

8. The apparatus of claim 5, wherein the at least a processor is configured to generate an envelope for the at least an electrode as a function of the distribution.

9. The apparatus of claim 5, wherein extracting the respiratory motion as a function of the respiratory phase comprises one or more of interpolating and smoothing the distribution representing position values corresponding to the plurality of temporal data which correspond to the plurality of velocity minima.

10. The apparatus of claim 1, wherein the processor is further configured to generate an electromechanical signal visualization comprising the at least a potential signal corresponding to the at least a position signal, wherein a downstream device displays the electromechanical signal visualization through a graphical user interface.

11. The apparatus of claim 1, wherein extracting the respiratory motion as a function of the respiratory phase comprises gating the at least a potential signal.

12. The apparatus of claim 1, wherein compensating for motion comprises:
receiving an external signal from an external sensor;
identifying, as a function of the external signal, a plurality of temporal values each associated with an external signal feature; and
plotting, using the at least a position signal, a distribution, representing position values corresponding to the plurality of temporal values.

13. The apparatus of claim 1, wherein extracting the respiratory motion comprises:
computing a complimentary motion profile based on motion data; and
applying the complimentary motion profile to the at least a position signal.

14. The apparatus of claim 1, wherein extracting the cardiac motion comprises
computing a complimentary motion profile based on motion data; and
applying the complimentary motion profile to the at least a position signal.

15. A method to mitigate cardiac motion and respiratory motion on geometric measurements of cardiac electrodes, wherein the method comprises:
detecting, using at least a catheter configured for intracardiac use, a cardiac phenomenon and output at least a potential signal as a function of the cardiac phenomenon, wherein the at least a catheter comprises at least an electrode;
receiving, using the at least a processor, at least a position signal of the at least a catheter comprising a first spatial coordinate, a second spatial coordinate, and a third spatial coordinate;
compensating, using a cardiac compensator and respiratory compensator, for motion, wherein compensating for respiratory motion comprises:
calculating at least a velocity signal, using the at least a position signal;
extracting, using the cardiac compensator, cardiac motion from the at least a position signal as a function of the at least a position signal and the at least a velocity signal;
determining, using the respiratory compensator, a respiratory phase by analyzing a rate of change of position values as a function of the at least a position signal; and
extracting the respiratory motion as a function of the respiratory phase.

16. The method of claim 15, wherein the at least a localization system comprises an electromagnetic localization system.

17. The method of claim 15, wherein a potential signal comprises an electrogram (EGM) signal.

18. The method of claim 15, wherein calculating the at least a velocity signal comprises computing a temporal derivative for of the at least a position signal.

19. The method of claim 15, wherein:
the at least a processor is further configured to determine, as a function of a velocity magnitude of the at least a velocity signal, a plurality of velocity minima, representing local minimum velocity values, and a corresponding plurality of temporal data, representing times of the local minimum velocity values;
the at least a processor is further configured to plot, using the at least a position signal, a distribution, representing position values corresponding to the plurality of temporal data; and
determining the respiratory phase comprises determining the respiratory phase by analyzing a rate of change of position values of the distribution.

20. The method of claim 19, wherein determining the plurality of velocity minima comprises searching the at least a velocity signal within a temporal envelope.

21. The method of claim 19, wherein the at least a processor is configured to generate an envelope for the at least an electrode as a function of the distribution.

22. The method of claim 21, wherein plotting the distribution comprises filtering at least a potential signal using the envelope as a boundary.

23. The method of claim 19, wherein extracting the respiratory motion as a function of the respiratory phase comprises one or more of interpolating and smoothing the distribution representing position values corresponding to the plurality of temporal data which corresponds to the plurality of velocity minima.

24. The method of claim 15, wherein the processor is further configured to generate an electromechanical signal visualization comprising at least a potential signal corresponding to the at least a position signal, wherein a downstream device displays the electromechanical signal visualization through a graphical user interface.

25. The method of claim 15, wherein extracting the respiratory motion as a function of the respiratory phase comprises gating at least a potential signal.

26. The method of claim 15, wherein compensating for motion comprises:
receiving an external signal from an external sensor;
identifying, as a function of the external signal, a plurality of temporal values each associated with an external signal feature; and
plotting, using the at least a position signal, a distribution, representing position values corresponding to the plurality of temporal values.

27. The method of claim 15, wherein extracting the respiratory motion comprises:
computing a complimentary motion profile based on motion data; and
applying the complimentary motion profile to the at least a position signal.

28. The method of claim 15, wherein extracting the cardiac motion comprises:
computing a complimentary motion profile based on motion data; and
applying the complimentary motion profile to the at least a position signal.

* * * * *